Figure 1:
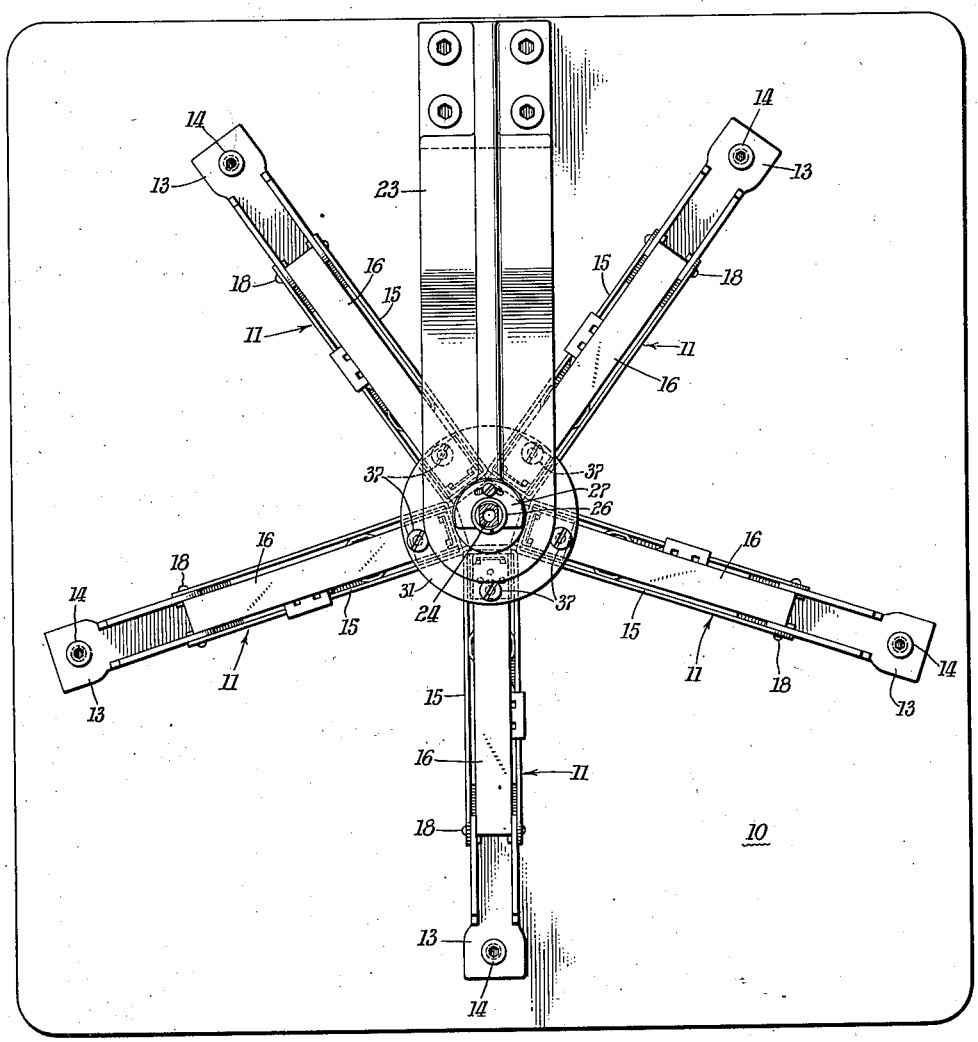

June 7, 1949.  T. P. DIDATO  2,472,469
STAPLE SETTING MACHINE
Filed Feb. 1, 1947  2 Sheets-Sheet 1

INVENTOR
Thomas P. Didato
BY
AGENT

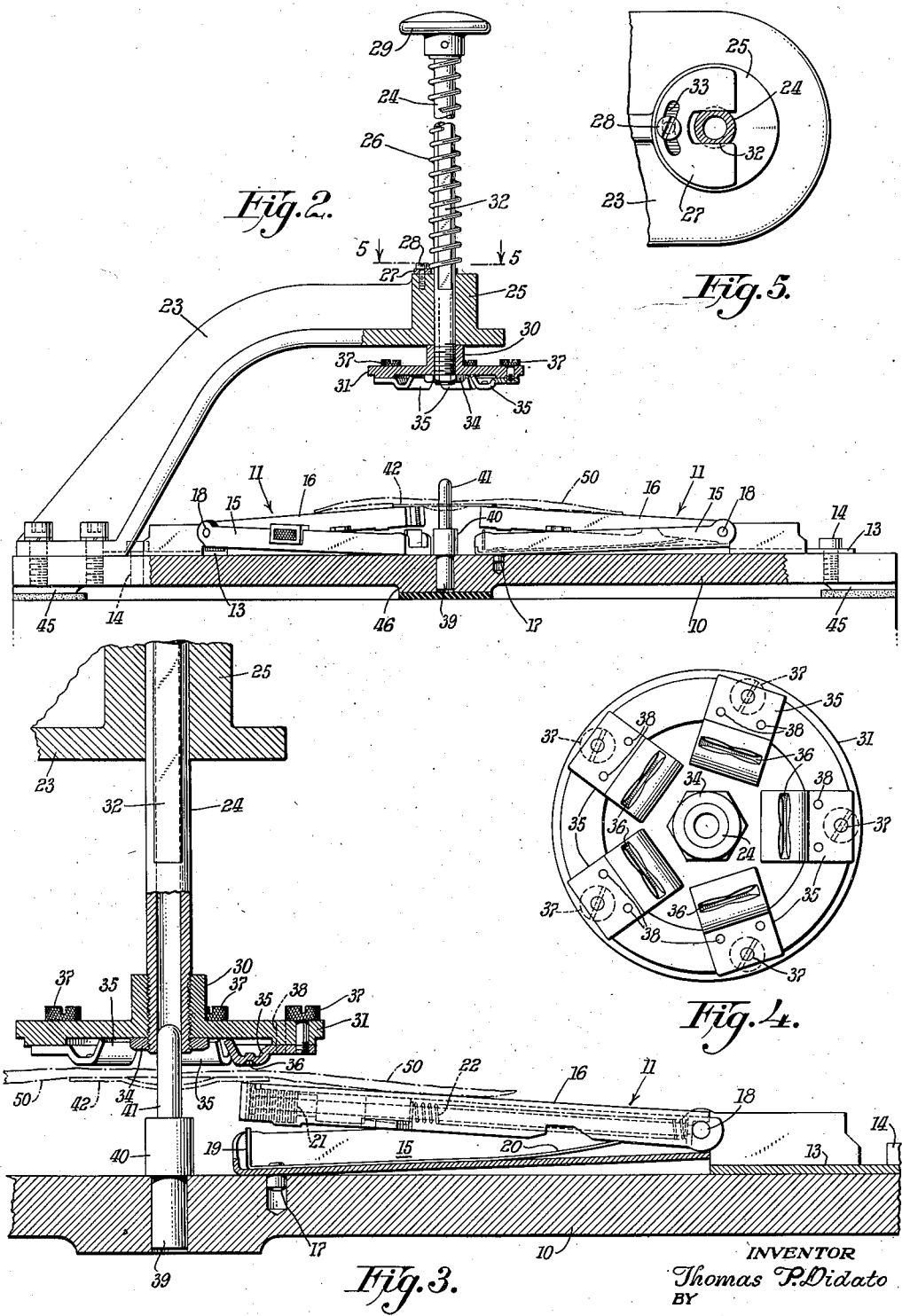

Patented June 7, 1949

2,472,469

UNITED STATES PATENT OFFICE 2,472,469

STAPLE SETTING MACHINE

Thomas P. Didato, Middlesex, N. J.

Application February 1, 1947, Serial No. 725,914

7 Claims. (Cl. 1—3)

This invention relates to improvements in staple setting machines. It is particularly adaptable to machines used to staple a group of gardenia leaves to a supporting piece in order that such an assembly may be used as a background setting with the flower to enhance its appearance and improve its salability.

Gardenias are frequently sold singly to be worn as an adornment. As a background for the flower in a use of this description the natural leaves on the gardenia stem do not serve particularly well due to their position with respect to the flower. Also, the leaves may be turned or broken or, a very beautiful flower may be combined on a stem having imperfect foliage, making it undesirable.

It is customary to overcome these deficiencies by selecting suitable leaves for the flowers and stapling a group of perfect leaves in a radiating pattern attached to a supporting center or hub. The support or hub usually consists of a disc of paper board about two inches in diameter having a centrally disposed circular opening permitting it to be threaded over a flower stem stripped of its natural foliage. In addition to providing a more satisfactory background, this assembly of leaves with their supporting piece tends to straighten out the under side petals of the flower which are closest to the stem resulting in a flower which appears to be a larger and more beautiful growth.

The leaves and the center support have, in the past, been assembled by stapling them together with a hand stapler of the kind which are sold as desk or ticket staplers. This is a slow and costly procedure particularly when there are as many as five leaves to be fastened to a single center support. Furthermore, a considerable amount of practice and skill are required to properly place the leaves and to staple them in the correct angular spacing.

With the foregoing introductory explanation in mind, it is the principal object of this invention to provide equipment for stapling a group of radially disposed leaves to a center supporting piece in a single stapling operation with greater accuracy and speed than has heretofore been possible with a single stitch stapler. A further object of the invention is to provide a multiple stapling device for the purpose described which may be constructed with commercially available materials which are machined according to accepted standards on conventional machine tools.

Staples must not project through the leaves and support having their bent-over ends at the underneath portion of the leaf lest they tear or catch in clothing. In the preferred physical embodiment of my invention, I therefore provide for the staple to be set with its ends turned over against the top side of the leaves. Inasmuch as the flower petals cover the staples, there is no disadvantage from an appearance standpoint in so doing.

I provide a plurality of stapler heads arranged on a plane support and radially disposed with respect to a common center. At the center I use a locating pin to guide the paper board center support and provide for the leaves to be arranged there-over in overlapping relationship with the support. A multiple clincher carrier is arranged to be brought down to bear against the stapler heads whereby each staple is engaged and forced through both the support and the leaves and is thereafter set on the top side of the leaves.

While I describe my invention particularly as it applies to use with flowers, there may be other similar uses to which it may be put where stapling is required on work pieces radially disposed with respect to a center; and the invention is not considered to be restricted to any one particular use, being equally adaptable for use with other materials.

Figure 6:
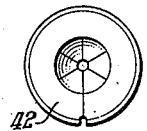
Figure 7:
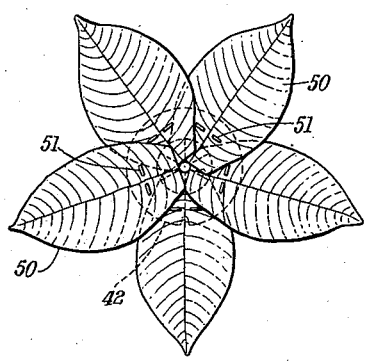
Figure 8:
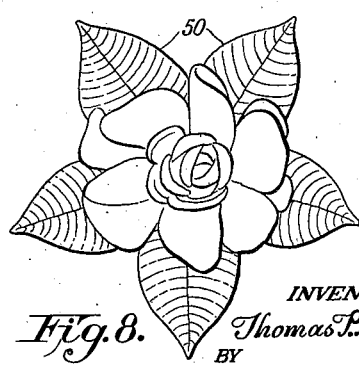

In the drawings,

Figure 1 is a top plan view of the machine of my invention showing the general arrangement of parts, Figure 2 is a side elevation view, partially in cross-section, of the assembled machine, Figure 3 is an enlarged fragmentary cross-section view showing details of my machine with parts arranged at a particular position in its operation, Figure 4 is a plan view showing the underside of the anvil used to set staples, Figure 5 is a transverse section view through the clincher carrier rod taken on lines 5—5 of Figure 2, Figures 6 and 7 are plan views of the work pieces processed with my machine, and Figure 8 is a plan view showing the assembly of a flower with the product of my invention.

Referring to the drawings wherein like numerals are used to describe like parts, in Figure 1, a rectangular metal base 10 provides a plane surface for removeably assembling thereto a plurality of stapler heads 11 in a radially disposed grouping with a common center. In the particular embodiment shown there are five such stapler heads having their longitudinal center lines uniformly angularly spaced 72° apart. The inwardly disposed front surfaces of the five heads give the appearance of a pentagon, and the outwardly extending ends 13 are rigidly fastened to base 10 with the use of hollow hexagon cap screws 14.

The stapler heads 11 may be of a conventional style similar in many respects to the heads on staplers used for desk work, as described in U. S. Patent No. 2,227,314 to Maynard. Figure 3 includes an enlarged view of one of the five identical heads arranged with the stapling end inward toward the center and with the staple legs directed upwardly. The supporting member 13 located on the outwardly extending end of stapler head 11 is fastened to base 10 by means of screw 14 and is hinged with a pair of relatively moveable arms 15 and 16. The lower arm 15 rests directly on the base 10 to resist stapling pressure and, affixed thereto is a locating pin 17 which is insertable in a suitable hole in the base 10. Pin 17, in combination with the supporting screw 14 on the member 13, maintains the stapler head in radial alignment with respect to the machine center. The hinge construction at 18 permits the arms 15 and 16 to swing upwardly away from the base for cleaning the surface of the base thereunder, and for convenience in staple clip loading.

The lower arm 15 carries the staple driver 19 which extends to the right of locating pin 17 to form a leaf spring 20 which maintains the upper arm 16 at a prescribed angular location with respect to the lower arm 15 for staple feeding. The upper arm 16 carries a clip of preformed staples 21 with staple legs disposed upwardly and it includes a suitable spring pressure device 22 to urge the staple clip 21 to the left whereby the end of staple clip 21 will be located at the throat of the stapler guide directly above the staple driver 19. Details of the stapler head are not further elaborated upon here inasmuch as these implements are well known in the art and are commonly used for attaching papers and other sheets and for otherwise stitching together various objects.

Referring now to Figures 2 and 3 the large metal bracket 23 rigidly fixed to base 10 provides an overhanging bearing support 25 for the hollow clincher carrier rod 24 which is vertically slidable normal to the plane of the stapler heads 11 on a line which intersects this plane at the common stapler head center. Rod 24 is normally restrained upwardly with respect to the bracket by means of the coiled compression spring 26 which is interposed between plate 27 resting on the top surface of bearing section 25 and the underneath surface of the plunger handle 29 which is pinned to the upper end of the rod. The extent of upward movement of rod 24 is regulated by the abutment of boss 30 on the clincher carrier 31 against the under surface of bearing 25, and it is arranged so that there is no obstruction to the manipulation of work pieces or to the operator's vision of work placed in position for stapling and so that stapling head arms 15 and 16 may be hinged upwardly without mechanical interference.

Referring to Figure 5, the clincher carrier rod 24 is restrained from turning in the bearing 25 by the association of the bifurcated guide plate 27 which engages the flats 32 on opposite side of rod 24. The plate 27 is fixed in place by screw 28 and the radial fastening slot 33 provides for fine angular adjustment of rod 24 as will be understood later in the specification.

Referring again to Figure 3, the clincher carrier 31 is threadedly fixed to the lower end of rod 24 and is concentric therewith and may be given a coarse fixed angular adjustment with respect to the rod by means of lock nut 34. Five identical clinchers 35 are provided, each of which has a suitable groove 36 for bending and setting the staple legs, each clincher being fastened to carrier 31 by means of a knurled head screw 37 and secured from turning with a pair of dowel pins 38. The clinchers are arranged in a plane which is parallel to the plane of stapler heads 11 and, as shown in Figure 4, in a radial pattern which is identical for angularity with the radial arrangement of staple heads 11 on base 10, having their longitudinal centers spaced uniformly 72° apart and positioned with respect to their common center so that grooves 36 will align themselves with and clinch the end staples in the staple clips 21 which, during stapling, will be engaged by the staple drivers 19.

The locating pin 39 is given a press fit into a hole in base 10 at the common center of the radially disposed heads 11 with a shoulder thereon formed by the major diameter portion 40 resting snugly against base 10. The minor diameter portion 41 at the top of pin 39 extends for a distance upwardly from the base to enter and guide the hollow clincher carrier rod 24 as this rod is moved downwardly against the pressure of coil spring 26. Pin 39 also serves as a centering fixture for the paper board supporting piece 42, shown in phantom in Figure 3, which is fitted over and slidable on the pin with its outer portion resting on the five stapling head arms 16, and extending a short distance beyond the end staple in the staple clip 21. The major diameter portion 40 of pin 39, on its upper shouldered surface, also acts as a stop to limit the travel of rod 24 downwardly during a stapling operation.

The apparatus described may be conveniently supported on a bench or table for operation and the base legs 45 are so provided. A center boss 46 integral with the base and projecting downwardly to the bench or table gives additional support at the location of stapling stress. It may also be desirable to add resilient pads as shown adhering on the surface of legs 45 and boss 46 to prevent sliding and to protect any finished surface on which the equipment is placed.

When setting up the machine for operation, the clincher carrier 31 should first be coarsely adjusted by means of the lock nut 34 to align the clincher grooves 36 in their proper position with respect to the stapling heads. If fine adjustment is required, the bifurcated plate 27 may be turned slightly angularly in one direction or the other and locked in place.

Assuming that the stapler magazines in heads 11 are loaded with stapling clips 21, a paper board supporting disc 42, which is shown separately in Figure 6, is first placed over the centering pin 39 as shown in Figure 3. Selected leaves 50 may then be arranged with their top sides upward and resting on the upper arms 16 or heads 11. Pressure is then exerted on the plunger handle 29 and the clincher carrier is moved down to first clamp the work pieces between the inwardly disposed ends of arms 16 and clinchers 35. Continued downward movement against the additional pressure of leaf springs 20 moves the arms 16 downwardly so that the drivers 19 will each engage a staple simultaneously and force its legs or prongs through the disc 42 and leaves 50 whereafter the staple legs will be bent inwardly and clinched by grooves 36. When the plunger handle is released and returns to its normal upward position, arm 16 separates from arm 15 permitting the staple clips 21 to move toward the center in their respective magazines and presenting a new group of staples for a subsequent operation. Figure 7 shows the combined disc and the leaves as they are taken from the machine after the staples have been set.

While I have described these steps in a manner which presents the impression of a relatively slow operation, this is not actually the case. In practice, the operations of setting work pieces and stapling take place very rapidly, particularly as compared to single leaf stapling.

I claim:

1. In a stapling machine, in combination, a horizontal support, a plurality of radially disposed magazine stapling heads carried by said support, and a plurality of staple clinchers moveable vertically with respect to said support to simultaneously clinch a plurality of staples at the stapling heads.

2. The method of preparing an assembly of leaves with a center support which comprises, locating a paper board support centrally with respect to a group of radially disposed stapler heads, placing leaves in a radial pattern on said stapler heads in overlapping relationship with said paper board support, and simultaneously stapling each leaf to the paper board support.

3. In a stapling machine, in combination, a support, a plurality of stapling heads having a common planar setting on said support and radially disposed with respect to a common center, and a plurality of staple clinchers having the same radial disposition with respect to a separate common center moveable with respect to said support to simultaneously clinch a plurality of staples at the stapling heads.

4. In a stapling machine, in combination, a support, a plurality of magazine stapling heads carried by said support and radially disposed with respect to a common center, hinge means to swing the stapling heads away from the common center of said stapling heads, and means attached to said support for simultaneously clinching a plurality of staples at the stapling heads.

5. In a stapling machine, in combination, a support, a plurality of radially disposed magazine stapling heads carried by said support, clincher means moveable normally with respect to said support for simultaneously clinching a plurality of staplers at the stapling heads, and a spring retained plunger rod integral with said clinching means for operation thereof.

6. In a stapling machine, in combination, a support, a plurality of stapling heads having a common planar setting on said support and radially disposed with respect to a common center, a plurality of staple clinchers having the same radial disposition with respect to a common center movable with respect to said support to simultaneously clinch a plurality of staples at the stapling heads, and a guide for aligning the staple clinchers with the stapling heads during movement of the staple clinchers.

7. In a stapling machine, in combination, a support, a plurality of magazine stapling heads having a common planar setting on the support and radially disposed with respect to a common center, a centering fixture carried by the support for locating a work-piece concentrically with respect to said common center, and a plurality of radially disposed staple clinchers movable with respect to said support to simultaneously clinch a plurality of staples at the stapling heads.

THOMAS P. DIDATO.

REFERENCES CITED

The following references are of record in the file of this patent:

UNITED STATES PATENTS

| Number | Name | Date |
| --- | --- | --- |
| 187,843 | Goodhue | Feb. 27, 1877 |
| 276,430 | Lambert | Apr. 24, 1883 |
| 680,721 | Locke | Aug. 20, 1901 |
| 696,466 | Morgan | Apr. 1, 1902 |
| 1,561,455 | Bertona | Nov. 17, 1925 |
| 2,380,746 | Gage | July 31, 1945 |